Dec. 27, 1932.  E. A. JOHNSTON  1,891,990
MOWER GUARD
Filed Jan. 20, 1930
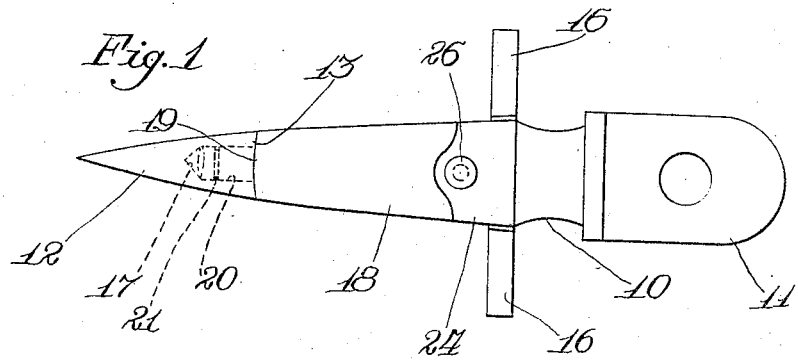
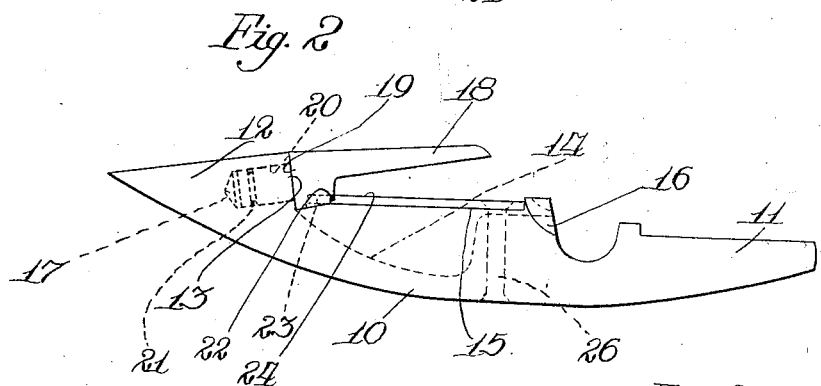
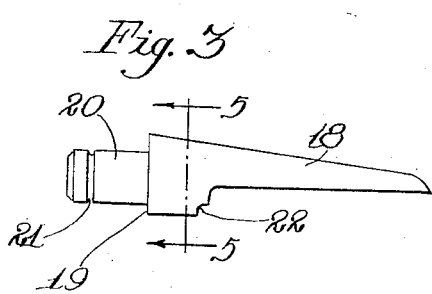
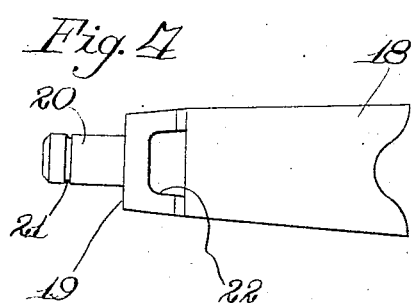
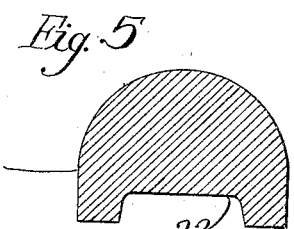
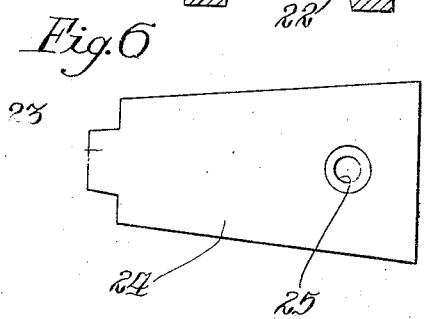
Inventor
E. A. Johnston
By W. P. Devliate
Atty.

Patented Dec. 27, 1932

1,891,990

UNITED STATES PATENT OFFICE

EDWARD A. JOHNSTON, OF CHICAGO, ILLINOIS, ASSIGNOR TO INTERNATIONAL HARVESTER COMPANY, A CORPORATION OF NEW JERSEY

MOWER GUARD

Application filed January 20, 1930. Serial No. 421,921.

This invention relates to a guard for use in mowing machines, binders and similar harvesters employing a cutting apparatus. The invention also relates to a method of assembling the guard.

More particularly, the invention relates to a guard, such for example as a mower guard, having a conventional body but formed without a lip, so that the upper surface thereof may be adapted to the process of forging to receive the ledger plate. The lip will be a separate forging having an end pressed into a recess in the body to assemble these two parts, the lip further being provided with a recess to receive the tongue of a ledger plate.

The objects of the invention are to provide an improved mower guard so formed that its ledger surface may be forged to lessen the cost of manufacturing these guards; to provide a guard having a separate lip, which lip is preferably forged and provided with a shank which is driven in a recess in the guard body to assemble these two parts; and, lastly, generally to improve guards of this kind.

Briefly stated, such objects may be achieved in a preferred example by providing a mower guard body of conventional shape with the exception that the same is formed without a lip. The body is provided with a recess adapted to receive by pressure a shank formed on the separate lip to assemble these two parts together.

In the accompanying sheet of drawing illustrating an example of this invention,—

Figure 1 is a top plan view of the guard;

Figure 2 is a side view of the guard with the lip assembled in the body;

Figure 3 is a detached side elevational view of the lip;

Figure 4 is a bottom plan view of the lip;

Figure 5 is a cross sectional view through the lip on an enlarged scale, as seen along the line 5—5 appearing in Figure 3; and, Figure 6 is a plan view of a ledger plate.

The body of the guard may be formed in any approved manner, such for example as by casting, said body being shown at 10 and having a heel portion 11 for securement to the cutter bar of a harvester, said body having the usual point 12 and being formed without a lip, thus providing a shoulder 13. The guard further may be formed hollow, as at 14, to save metal and make the same as light as possible, said body being formed on its top side with the usual ledger surface 15. The guard may also have the usual wing extensions 16, which serve in a well known manner as spacers and abutments for a series of adjoining guards when mounted on the cutter bar.

The shoulder 13 on the top side of the body is drilled out to leave a recess 17 extending into the body, as shown, toward the point thereof. A separate lip portion 18 is provided having a shoulder 19 and a cylindrical extension or shank 20 provided by turning the same on a lathe or appropriate machining tool. This shank extension 20 should be slightly larger than the diameter of the recess 17. The shank is also preferably provided with an annular groove 21 and a recess 22 on its end side to receive a tongue 23 of the ledger plate 24, which ledger has an opening 25 therein to permit securement of the same by means of a rivet pin 26 in the usual manner to the body of the guard.

The lip 18 will preferably be formed as forging and the shank 20 will subsequently be turned thereon in any well known manner. The shank 20 is then forced by pressure into the recess 17 to assemble the lip and body together, and, as the shank 20 is slightly larger in diameter than said recess, it is important that the diameter of the point 12 around the recess 17 be provided with sufficient metal so that excessive expansion of the point will be prevented when the shank 20 is forced into said recess 17. Additional pressure is then applied around the point 12 to cause the metal thereof to flow into the groove 21 in the shank, whereby the two parts are securely interlocked together. If desired, the point 12 may be slightly initially swollen or enlarged, so that after this latter compression has been effected, the point of the guard will have the desired shape after the metal thereof has been pressed into the annular groove. Next the ledger plate 24 is slid into place with its tongue 23 in the recess 22 of the lip, and the rivet pin 26 is then provided to lock the plate to the body in the usual manner.

From this detailed disclosure, it must now be apparent that an improved guard has been provided which achieves all of the desirable objects of this invention hereinafter recited.

It is the intention to cover all such changes and modifications of the preferred example herein shown as do not materially depart from the spirit and scope of this invention as indicated by the following claims.

What is claimed is:

1. The method of making a mower guard comprising the steps of forming a body provided with a shoulder on its top, providing a recess in the shoulder extending into the body, providing a lip having a shoulder and an end adapted to fit said recess, and lastly assembling the lip and body by pressing the end into said recess to cause said shoulders to abut.

2. The method of making a mower guard comprising the steps of forming a body provided with a shoulder on its top, drilling a recess in the shoulder extending into the body, providing a lip having a shoulder and a turned end extending from said shoulder which end is slightly larger than the recess, and lastly assembling the lip and body by pressing the end into said recess until said shoulders abut.

3. The method of making a mower guard comprising the steps of forming a body provided with a shoulder on its top, providing a recess in the shoulder extending into the body, providing a lip having a shoulder and an end extending from said shoulder which end is formed to be slightly larger than the recess and provided with a groove, assembling the lip and body by pressing the end into said recess until said shoulders abut, additional pressure being applied to the body to cause the metal thereof to fill in the said groove whereby securely to lock the lip to said body.

4. The method of making a mower guard comprising the steps of forming a body provided with a shoulder on its top, drilling a recess in said shoulder extending into the body, providing a lip having a shoulder and a turned end extending from said shoulder which end is formed to be slightly larger than the recess and provided with an annular groove, assembling the lip and body by pressing the end into said recess until said shoulders abut, additional pressure being applied to the body around its recess to cause the metal thereof to fill in the said groove whereby securely to lock the lip to said body.

5. A mower guard structure in which the body is provided with a recess adjacent its pointed end and a surface for mounting a ledger plate, and a separate lip to overlie such ledger surface and having at one end a lengthwise extension press fitted into said recess securely to assemble said parts.

6. A mower guard structure in which the body is provided with a cylindrical drilled recess adjacent its pointed end and a surface for mounting a ledger plate, and a separate lip to overlie such ledger surface and having at one end a lengthwise cylindrical extension press fitted into said recess securely to assemble said parts.

7. A mower guard structure in which the body is provided adjacent its pointed end with a recess, and a separate lip having a lengthwise extended shank at one end formed with a groove, the shank being pressed into said recess to assemble said parts, said groove being filled in with the metal of the body when pressure is applied to said body adjacent said groove.

8. A mower guard structure in which the body is provided with a recess adjacent its pointed end and a surface for mounting a ledger plate, and a separate lip to overlie such ledger surface and having at one end a lengthwise extension formed as a shank press fitted into said recess to assemble said parts, said lip including a recess to receive the tongue of a ledger plate.

9. A mower guard structure in which the body is provided with a recess adjacent its pointed end and a separate lip having a lengthwise extended shank, said shank having a drive fit in said recess frictionally to secure said guard parts together.

In testimony whereof I affix my signature.

EDWARD A. JOHNSTON.